United States Patent Office 3,748,345
Patented July 24, 1973

3,748,345
PREPARATION OF ALKYLENE CARBONATES BY REACTION OF ALKYLENE OXIDES WITH CARBON DIOXIDE
Ralph J. De Pasquale, Berkeley, Calif., assignor to Shell Oil Company, New York, N.Y.
No Drawing. Filed July 2, 1971, Ser. No. 159,558
Int. Cl. C07d 13/06
U.S. Cl. 260—340.2        9 Claims

ABSTRACT OF THE DISCLOSURE

Alkylene carbonates are prepared by reacting an alkylene oxide with carbon dioxide in the presence of a coordinatively unsaturated zero-valent nickel complex.

BACKGROUND OF THE INVENTION

This invention relates to the production of alkylene carbonates by the reaction of alkylene oxides with carbon dioxide. More particularly, this invention is directed to the production of alkylene carbonates from oxirane compounds wherein a catalyst is employed for promoting the reaction.

THE PRIOR ART

The reaction of carbon dioxide with alkylene oxides to produce the corresponding alkylene carbonates does not give significant amounts of product in the absence of a catalyst. Catalytic agents which have heretofore been proposed for promoting the reaction of oxirane compounds with carbon dioxide include alkali-impregnated activated carbon, Vierling, German Pat. 740,366; certain magnesium and calcium halides, Cline, U.S. 2,667,479; ammonium halides, Lichtenwalter et al., U.S. 2,773,070; amines, Dunn, U.S. 2,773,881; quaternary ammonium compounds, McClellan, U.S. 2,873,282; previously used reaction medium containing magnesium or calcium halides, Mills, U.S. 2,907,771 and U.S. 2,924,608; urea-hydrohalic acid salts, Millikan et al., U.S. 2,993,908; organic sulfonium compounds or sulfonium salts, Crosby et al., U.S. 2,994,704; organic phosphonium compounds or phosphonium salts, Crosby et al., U.S. 2,994,705; hydrazine and its hydrohalides, Emmons, U.S. 3,535,341; and guanidine and its salts. These synthesis methods are subject to a number of practical disadvantages, including the clogging of lines, valves, and pumps by gelatinous precipitates, the danger of explosions, slow reaction rates except when elevated temperatures are employed, poor product yields, and/or contaminated products requiring extensive purification trains.

BRIEF SUMMARY OF THE INVENTION

It has now been found that oxirane compounds and carbon dioxide readily combine to form alkylene carbonates in excellent yield and selectivity in the presence of coordinatively unsaturated zero-valent nickel complexes.

DETAILED DESCRIPTION OF THE INVENTION (A) The coordinatively unsaturated zero-valent nickel catalytic complex.—The catalytic species employed in the present invention to form alkylene carbonates from oxirane compounds and carbon dioxide are coordinatively unsaturated zero-valent nickel complexes. The coordinatively unsaturated zero-valent nickel complex useful as catalyst in the present invention are nickel species having a valence of zero coordinated to no more than four, and preferably to two, stabilizing ligand groups. Generically, the catalytic species has the structure shown in Formula I:

(I)         $L_nNi$ wherein

L represents a stabilizing ligand, preferably of the tertiary phosphine variety, and
$n$ is an integer number from 2 to 4, inclusive.

The stabilizing ligand group L has the general structure shown in Formula II:

(II)        $X_3P$ wherein

X represents a substituted or unsubstituted organic moiety, preferably hydrocarbyl. The X's may be the same or different, giving rise to symmetrical or unsymmetrical phosphine ligands, and are selected from substituent groups containing from 1 to about 10 carbon atoms such as alkyl groups including methyl, butyl, sec-butyl, hexyl and nonyl; aryl groups such as phenyl, tolyl, and the like; and cycloalkyl groups, such as cyclohexyl, cycloheptyl, cyclooctyl, etc.

A variety of zero-valent nickel complexes may be employed as catalysts for the reaction of alkylene oxides with carbon dioxide, including bis-, tris-, and tetrakis-(phosphine)nickel(O) species. Under reaction conditions, the tris- and tetrakis- complexes appear to disassociate in situ to give the preferred zero-valent catalytic species containing two stabilizing ligands. For example, tetrakis-(triphenylphosphine)nickel(O) is in equilibrium with complexes having varying coordination number, as shown in Equation I, and zero-valent nickel species having varying degrees or coordination are probably present.

(I) 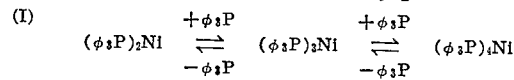

Representative coordinatively unsaturated zero-valent nickel complexes either as such, or in a dissociated state which are capable of catalyzing the reaction of an oxirane substrate with carbon dioxide include bis(triphenylphosphine)nickel(O),
bis-(tri-p-tolylphosphine)nickel(O),
bis-(tricyclohexylphosphine)nickel(O),
tris-(triphenylphosphine)nickel(O),
tris-(diphenylmethylphosphine)nickel(O),
tetrakis-(triphenylphosphine)nickel(O),
tetrakis-(diphenylmethylphosphine)nickel(O),
tetrakis-(tri-n-butylphosphine)nickel(O), and similar materials.

The coordinatively unsaturated zero-valent nickel catalytic complexes of the present invention may be prepared in a variety of ways. For example, preparative techniques for tetrakis- and bis-(triphenylphosphine)nickel(O) are to be found in Examples 16 and 17 of British Pat. 935,716. By another technique, a bis- or tris-(phosphine)nickel dibromide or monobromide, respectively, combines with one or more moles of the corresponding phosphine in a suitable solvent during electrochemical reduction at a controlled potential. Thus, tetrakis-(diphenylmethylphosphine)nickel(O) is prepared directly from

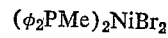

and $\phi_2$PMe in a benzene-acetonitrile solvent by electrolysis at −1.50 volts. Still another method for preparing the coordinatively unsaturated zero-valent nickel complexes involves the reduction of a bis-(phosphine)nickel dibromide in acetonitrile with sodium amalgam, for example, as shown in Equation II:

(II) 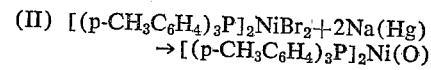

(B) The oxirane substrate.—Oxirane materials which react under the influence of the coordinatively unsaturated zero-valent nickel complexes of the present invention to form alkylene carbonates have the structure shown in Formula II:

(II) 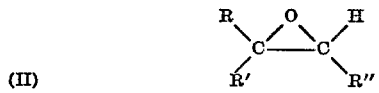

in which R, R', and R" represent hydrogen, hydrocarbyl groups, or substituted hydrocarbyl groups containing electron-withdrawing moieties such as halide, cyanide, ether, and the like of up to 20 carbon atoms. Preferably R, R', or R" as a halo-substituted or unsubstituted hydrocarbyl group contains 1 to about 5 carbon atoms and up to 2 halogen (particularly chlorine) substituents. Any two of the groups R, R', and R" may be interconnected to form, with one or two of the carbon atoms shown in Formula II, a carbocyclic ring.

Suitable oxirane compounds useful for combining with carbon dioxide in the presence of the zero-valent nickel catalysts of the present invention include ethylene oxide, propylene oxide, isobutylene oxide, 1,2-epoxybutane, 2,3-epoxy butane, epoxypentanes, epoxyhexanes, cyclohexylethylene oxide, cyclohexene oxide, styrene oxide, methylenecyclohexane oxide, and similar compounds having a three-membered oxirane ring. Epoxy materials containing atoms other than hydrogen and carbon also react with carbon dioxide under the influence of coordinatively unsaturated zero-valent nickel complexes to form alkylene carbonates. For example, epichlorohydrin, epicyanohydrin, and similar oxiranes containing electron-withdrawing groups react to form carbonates.

(C) The reaction conditions.—The amount of catalyst required to carry out the process of the present invention depends somewhat on the reactions conditions, but is usually within the limits of about 0.1 to 10% by weight, based on the amount of alkylene oxide charge. The catalyst concentration will vary as different temperatures, catalysts, contact times and pressures are used. The solubility of the catalyst in any diluent or carrier for the reaction may vary. The catalyst may be dissolved in the oxirane reactant, or in a diluent, or it may be placed directly in the reaction zone by suitable means for controlling the amount added. In certain instances it is undesirable to contact the catalyst with the oxirane compound in the absence of the carbon dioxide, as this may promote side reactions and decreased yields of the desired alkylene carbonate.

The reaction is carried out at a temperature of from about 50° to about 200° C., preferably from about 75° to about 125° C., and under a pressure of at least 100 p.s.i.g., and preferably greater than about 300 p.s.i.g. Thus, the reaction of the present invention proceeds at a considerably lower temperature than previously known methods.

The reaction may be conducted either batchwise or continuously. For example, the catalyst may be continuously introduced in solution form along with the alkylene oxide and the carbon dioxide under the desired pressure into one end of a reaction vessel and the products of reaction continuously withdrawn from the other end. Alternatively, batches of the alkylene oxide and the catalyst may be introduced into an autoclave or bomb-type reactor, the desired pressure built up by introducing carbon dioxide and the reaction mixture agitated while maintaining a superatmospheric pressure of carbon dioxide. Irrespective of whether a batch or continuous procedure is followed, each unit weight of reactant and reaction product is maintained at reaction temperature from about 1 to about 24 hours, and preferably from about 4 to about 10 hours.

The alkylene oxide and carbon dioxide are mixed in proportions to provide an excess of carbon dioxide over and above the stoichiometric amount required for reaction. This excess may be of the order of from about 5% to about 1000% by weight.

Alkylene carbonate formation by the method of the present invention may be carried out with or without a diluent which is nonreactive and aids in controlling the reaction temperature. Suitable inert solvents or diluents include aromatic hydrocarbons, for example, benzene, toluene, xylenes, etc.; ethers; tetrahydrofuran; dipolar, aprotic solvents such as dimethylformamide; as well as previously prepared alkylene carbonate product.

(D) Alkylene carbonate products.—A wide variety of alkylene carbonate products may be prepared by the method of the present invention. From ethylene oxide, ethylene carbonate is prepared. This material finds wide application as a solvent in the manufacture of polymers and resins; is employed in solvent extractions; and serves as an intermediate in the synthesis of pharmaceuticals, rubber chemicals, and textile finishing agents. Propylene carbonate is prepared from propylene oxide and carbon dioxide in the presence of the coordinatively unsaturated zero-valent nickel complexes. Propylene carbonate has been employed as a solvent for nylon manufacture (see British Patent 645,033), and is employed in organic syntheses in the formation of carbamates and as an hydroxypropylation and transesterification agent. Similar uses are made of the higher alkylene carbonates

EXAMPLES

Example 1. Preparation of coordinatively unsaturated zero-valent nickel complexes (A) Preparation of bis-(triphenylphosphine) nickel-(O) with sodium amalgam.—Bis-triphenylphosphine nickel(II) dibromide, prepared by the method of Venanzi, J. Chem. Soc., 719 (1958), (22.3 g., 0.0300 mole) was added to a mechanically stirred mixture of sodium amalgam (1.73 g. Na—0.0750 g./At in 300 ml. Hg) and acetonitrile (500 ml.) over a period of 0.5 hr. During the addition the color of solution changed from green to yellow to brown and then deposited the red brown $(\varphi_3P)_2Ni$. At the completion of the Ni(II) salt addition the mixture was stirred for 0.5 hr. The Hg was then removed through a stopcock at the bottom of the flask. The acetonitrile was carefully decanted from the precipitate and discarded. The remaining precipitate was dissolved with $C_6H_6$ (4-25 ml. portions) and the solution then filtered leaving Hg-occluded NaBr. Concentration of the dark brown $C_6H_6$ solution in vacuo gave 13–15 g. (74–84%) of air sensitive $(\varphi_3P)_2Ni$. The material was dried on high vac removing residual $C_6H_6$, M.P. 155–157° (dec.). Bis-triphenylphosphine nickel(O) can be recrystallized from $C_6H_6$ (or $\varphi$-$CH_3$) hexane with appreciable loss due to solubility. Thus, the uncrystallized material was used for the catalytic reactions described in Example 2.

Analysis.—Found (percent): C, 74.1; H, 5.1; P, 11.5, Calculated for $(\phi_3P)_2Ni$ (percent): C, 74.13; H, 5.18; P, 10.62.

(B) Preparation of bis-(triphenylphosphine)nickel(O) by electrolysis.—A catholyte solution was prepared by dissolving $(\phi_3P)_3NiBr$ (1.54 g., 1.66 mmoles) and $Et_4NClO_4$ (4.59 g., 20.0 mmoles) in 200 ml. of a 10% v./v. benzene-acetonitrile mixture. Electrolysis of this solution with a platinum cathode at −1.60 volts for 2½ hrs. produced a dark red-brown solution which contained no solids. Reduction of the volume of this solution by ½ caused a dark red brown solid to form. This complex was removed from the mother liquid by filtration and washed with acetonitrile. After drying the dark red crystalline solid weighed 0.92 g. (94% of theory), M.P. 151–152°. Elemental analysis was the same as in Example IA.

(C) Preparation of bis - (tri-p-tolylphosphine) nickel(O) with sodium amalgam.—Substitution of $[(p-CH_3C_6H_4)_3P]_2NiBr_2$ for bis-(triphenylphosphine)- nickel(II) dibromide in Example I(A) gave bis-(tri-p-tolylphosphine)nickel(O), which had a brown color and a melting point of 122–125° C. (dec.).

poorer epoxide conversion and carbonate selectivity than the coordinatively unsaturated zero-valent nickel catalysts of the present invention.

TABLE.—ALKYLENE CARBONATE FORMATION WITH COORDINATIVELY UNSATURATED ZERO VALENT NICKEL COMPLEXES

| | | | | Reaction conditions | | | | | Carbonate selectivity, percent |
|---|---|---|---|---|---|---|---|---|---|
| Run | Catalyst type | Amt., gms. | Epoxide substrate | Duration, hrs. | Temp., °C. | Solvent | Carbonate product | Epoxide conv., percent | |
| 1 | $(\phi_3P)_2Ni$ | 0.25 | Ethylene oxide | 4 | 100 | $C_6H_6$ | Ethylene carbonate | 25 | >95 |
| 2 | $(\phi_3P)_2Ni$ | 0.25 | ----do---- | 12 | 100 | $C_6H_6$ | ----do---- | 50 | >95 |
| 3 | $[(C_6H_{11})_3P]_2Ni$ | 0.25 | ----do---- | .4 | 100 | $C_6H_6$ | ----do---- | 60 | >95 |
| 4 | $(C_6H_{11})_3P$ | 0.25 | ----do---- | 24 | 100 | $C_6H_6$ | ----do---- | 25 | >95 |
| 5 | $(\phi_3P)_2Ni$ | 0.25 | Isobutylene oxide | 24 | 100 | $C_6H_6$ | Isobutylene carbonate | ~10 | ~60 |
| 6 | $[(C_6H_{11})_3P]_2Ni$ | 0.25 | ----do---- | 48 | 100 | $C_6H_6$ | ----do---- | ~100 | >95 |
| 7 | $(C_6H_{11})_3P$ | 0.25 | ----do---- | 48 | 100 | $C_6H_6$ | ----do---- | ~25 | ~70 |
| 8 | $[(C_6H_{11})_3P]_2Ni$ | 0.25 | 2,3-epoxybutane (cis/trans) | 24 | 100 | $C_6H_6$ | dimethyl ethylene carbonate | ~1 | |
| 9 | $(\phi_3P)_2Ni$ | 0.25 | epichlorohydrin | 1.5 | 100 | $C_6H_6$ | chloromethyl ethylene carbonate | 100 | >95 |
| 10 | $\phi_3P$ | 0.25 | Same as above | 10 | 100 | $C_6H_6$ | Same as above | 75 | 70 |
| 11 | $Et_4\overset{\oplus}{N}\overset{\ominus}{Br}$ | 0.3 | ----do---- | 1 | 150–200 | THF | ----do---- | 80 | 75 |

*Analysis.*—Found (percent): C, 75.8; H, 6.5. Calculated for $C_{42}H_{42}P_2Ni$ (percent): C, 75.6; H, 6.3.

(D) Preparation of bis-(tricyclohexylphosphine)nickel-(O) with sodium amalgam.—Bis-(tricyclohexylphosphine)nickel(O) was prepared by the method of Example 1(A) starting from bis-(tricyclohexylphosphine) nickel(II) dibromide. Again, the color of the coordinatively unsaturated zero-valent nickel complex was brown; the melting point was approximately 165–168° C. (dec.).

*Analysis.*—Found (percent): C, 69.5; H, 10.7. Calculated for $C_{36}H_{66}P_2Ni$ (percent): C, 69.5; H, 10.8.

Example 2. Preparation of alkylene carbonates with bis-(phosphine)nickel(O) catalysts A variety of alkylene carbonates were prepared by reacting oxirane substrates with carbon dioxide in the presence of the zero-valent nickel complexes prepared in Example 1, as shown in the table. The procedure employed was to weigh the catalyst into an 80 ml. stainless steel autoclave maintained under an inert atmosphere, following which the appropriate reagents were added. Carbon dioxide was charged at a pressure of 500 p.s.i. throughout the runs shown in the table.

Under reaction conditions, a cis- and trans-mixture of 2-butylene oxide reacted languidly (Run 8) with $CO_2$ in the presence of zero valent nickel complexes to afford the corresponding carbonate. The rate of alkylene carbonate formation appears to depend on the structure of the alkylene oxide substrate, decreasing in the order

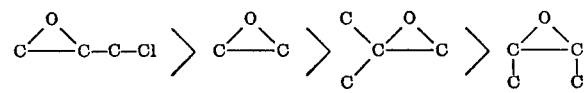

Control reactions demonstrated that ethylene carbonate was not formed catalytically from either $\phi_3P$ or $\phi_3P{\rightarrow}O$. However, the carbonates derived from ethylene oxide, isobutylene oxide, or epichlorohydrin and $CO_2$ are catalyzed by $(C_6H_{11})_3P$, but at appreciably slower rates than the reactions catalyzed by the $L_nNi$ complexes. Run 11, which employed a quaternary ammonium catalyst of the prior art, and which is detailed for purposes of comparison, required a higher reaction temperature and gave

I claim as my invention:

1. The process of producing alkylene carbonates by contacting an alkylene oxide with carbon dioxide at a temperature from about 50° to about 200° C. and a pressure above about 100 p.s.i.g. in the presence of a coordinatively unsaturated zero-valent nickel complex having the formula $$L_nNi$$

wherein L is a tertiary phosphine stabilizing ligand and $n$ is an integer number from 2 to 4, inclusive.

2. The process of claim 1 wherein the tertiary phosphine stabilizing ligand has the formula $$X_3P$$

wherein each X is independently selected from the group consisting of alkyl, aryl, and cycloalkyl hydrocarbyl moieties.

3. The process of claim 2 wherein the coordinatively unsaturated zero-solvent nickel complex is selected from the group consisting of bis-(triphenylphosphine)nickel(O), bis-(tri-p-tolylphosphine)nickel(O), and bis(tricyclohexylphosphine)nickel(O).

4. The process of claim 2 wherein the coordinatively unsaturated zero-valent nickel complex is selected from the group consisting of
tris-(triphenylphosphine)nickel(O),
tris-(diphenylmethylphosphine)nickel(O),
tetrakis-(triphenylphosphine)nickel(O),
tetrakis-(diphenylmethylphosphine)nickel(O),
tetrakis-(tri-n-butylphosphine)nickel(O).

5. The process of claim 1 wherein the alkylene oxide is ethylene oxide.

6. The process of claim 1 wherein the alkylene oxide is propylene oxide.

7. The process of claim 1 wherein the alkylene oxide is 2,3-epoxybutane.

8. The process of claim 1 wherein the alkylene oxide is isobutylene oxide.

9. The process of claim 1 wherein the alkylene oxide is epichlorohydrin.

No references cited.

NORMA S. MILESTONE, Primary Examiner